(12) United States Patent
Zlotocha

(10) Patent No.: US 7,934,331 B2
(45) Date of Patent: May 3, 2011

(54) SYSTEM FOR DISPLAYING PHOTOGRAPHS

(75) Inventor: Peter S. Zlotocha, Hartland, WI (US)

(73) Assignee: Snap Gallery, LLC, Hartland, WI (US)

( * ) Notice: Subject to any disclaimer, the term of this patent is extended or adjusted under 35 U.S.C. 154(b) by 0 days.

(21) Appl. No.: 12/464,910

(22) Filed: May 13, 2009

(65) Prior Publication Data

US 2009/0218470 A1    Sep. 3, 2009

Related U.S. Application Data

(63) Continuation-in-part of application No. 11/610,028, filed on Dec. 13, 2006, now abandoned.

(51) Int. Cl.
G09F 1/12 (2006.01)
(52) U.S. Cl. .................... 40/735; 403/252; 403/258
(58) Field of Classification Search .............. 40/605, 40/735, 729, 741; 403/252, 255, 264, 331, 403/353; 248/466, 475.1, 235, 250; 211/41.13, 211/94.01, 189, 182, 186, 191, 192; 206/455
See application file for complete search history.

(56) References Cited

U.S. PATENT DOCUMENTS

| | | | |
|---|---|---|---|
| 3,041,762 A | 7/1962 | Knox | |
| 4,209,922 A | 7/1980 | Porreca | |
| 4,385,459 A | 5/1983 | McGrath et al. | |
| 5,341,942 A | 8/1994 | James, Jr. | |
| 5,342,014 A | 8/1994 | Wilson | |
| D405,306 S | 2/1999 | Wilkening et al. | |
| 6,053,468 A | 4/2000 | Francis | |
| 6,212,810 B1 | 4/2001 | Jones | |
| 6,715,620 B2 | 4/2004 | Taschek | |
| 7,004,667 B2* | 2/2006 | Ludwig et al. | 403/258 |
| 7,100,317 B1 | 9/2006 | Strong | |
| 2003/0038222 A1 | 2/2003 | Holmes | |
| 2004/0016164 A1 | 1/2004 | Gilchrist et al. | |
| 2005/0223611 A1 | 10/2005 | Dennis | |

OTHER PUBLICATIONS

Constant Force springs, stock from Vulcan Spring & Mfg. Co.; website http://www.globalspec.com/FeaturedProducts/Detail/VulcanSpringan . . . ; Date last visited Nov. 10, 2006; 1 page.
U.S. Appl. No. 11/610,028, filed Dec. 13, 2006, Zlotocha.

* cited by examiner

*Primary Examiner* — Joanne Silbermann
*Assistant Examiner* — Shin Kim
(74) *Attorney, Agent, or Firm* — Reinhart Boerner Van Deuren P.C.

(57) ABSTRACT

A system for displaying photographs is disclosed. The system includes one or more horizontal members or bars that are secured to a wall, such as a wall of a house. The horizontal members are preferably immovably secured, as by wall anchors or nails. The horizontal members preferably include a profile, such as a shaped, hollow cross-sectional area, that is configured to mount two or more vertical members. Two or more vertical members or bars are then secured to the horizontal members. The vertical members may be mounted using the profiles, channels, or grooves of the horizontal members. They may be mounted using a connection stud, a tab or a clamp, such as a spring clamp. The vertical members preferably also include continuous, vertical grooves on their sides, for placing photographs into the grooves for display.

11 Claims, 12 Drawing Sheets

SYSTEM FOR DISPLAYING PHOTOGRAPHS

CROSS-REFERENCE TO RELATED PATENT APPLICATIONS

This patent application is a continuation-in-part of co-pending U.S. patent application Ser. No. 11/610,028, filed Dec. 13, 2006, which is now pending, the entire teachings and disclosure of which are incorporated herein by reference thereto.

FIELD OF THE INVENTION

This invention generally relates to a system for mounting photographs and other images for display.

BACKGROUND OF THE INVENTION

The present invention is directed to systems for displaying photographs and similar items in a pleasing manner. The prior art shows several examples of systems for holding or displaying objects, but none has the desired degree of simplicity and reliability that is sought in the present invention. For example, U.S. Pat. Nos. 3,041,762 and 7,100,317 each provide a device for displaying a picture or photograph, but do not provide for a way to display more than a single photograph at a time. In addition, each provides no way to support the display device other than directly onto a horizontal surface, such as a table or a shelf.

Other prior art devices provide for more than a single photograph or object, but do not provide for a display device that is easy to use, i.e., to change the objects, also provide for a way to hold the devices securely. For example, U.S. Pat. No. 5,341,942 discloses a system for displaying compact discs, using a series of vertical and horizontal members. The horizontal members have a horizontal groove for holding compact discs in a loose manner, rather than holding them securely. In addition, this disclosure does not specify how the horizontal members are supported on the vertical members, other than very heavy and awkward-looking support members.

Another prior art invention in this field, U.S. Pat. No. 6,715,620, uses frames to secure and display album covers for phonographic records. The album covers are captured in vertical slots of horizontal slats, the horizontal slats being part of a frame for holding the album covers. The covers must be fully inserted from the side, and thus are not easily removed from the frame. In addition, there is no detail on how the frame is assembled other than that the members are made of solid wood pieces. These frames would thus be heavy and, because of the shape of method of making the slots, would also be difficult to use.

U.S. Design Pat. D405,306 is similar to the above two multiple-object display devices, in the sense that it also depicts a frame or wall grid. The illustrations in the design patent seem to be made from solid objects, such as wood or plastic. It is not obvious how the components are held together, and there are no obvious slots for holding photographs or other objects.

U.S. Pat. No. 6,053,468 discloses a frame support system for holding frames, such as framed art work or similar objects. This system would not enable a user to support photos or art work independently, since each object would still require a frame or other support. In this system, for instance, the frame support system would provide a way to support frames via a wire attached to the rear of the frame. This system would be more elegant than a wall anchor and nail support, but would still require separate frames for each object.

Embodiments of the present invention provide an improved frame support without the disadvantages of the above prior art devices. These and other advantages of the invention, as well as additional inventive features, will be apparent from the description of the invention provided herein.

BRIEF SUMMARY OF THE INVENTION

One embodiment of the invention is a system for supporting photographs. The system includes at least one horizontal member having a hollow portion, and two or more vertical members having a shaped cross section and configured for support by the at least one horizontal member, wherein the at least one horizontal member is configured for mounting in a primarily horizontal orientation and the vertical members are configured for mounting in a vertical orientation, the vertical members also having a portion for mounting in the hollow portion of one or more of the at least one horizontal member, and the vertical members are configured for supporting photographs.

Another embodiment of the invention is a system for supporting and displaying photographs. The system includes at least one horizontal member having a cross-section in the shape of a channel or groove, and two or more vertical members having a profile and configured for support by the at least one horizontal member, wherein the at least one horizontal member is configured for mounting in a primarily horizontal orientation and the vertical members are configured for mounting in a vertical orientation, the at least one horizontal member configured for continuous horizontal adjustment of the vertical members, the vertical members also having a portion for mounting in the channel or groove of one or more of the at least one horizontal members, the vertical members configured for supporting and displaying objects.

Another embodiment of the invention is a system for supporting and displaying photographs. The system includes two or more horizontal members having a cross-section in the shape of a channel, and two or more vertical members having vertical grooves for supporting and displaying photographs, the vertical members configured for support by the horizontal members by plastic tabs attached to the vertical members and inside the channel, wherein the horizontal members are configured for mounting in a horizontal orientation and the vertical members are configured for mounting in a vertical orientation, the horizontal members configured for continuous horizontal adjustment of a position of the vertical members.

Another embodiment of the invention is a system for supporting photographs. The system includes two or more horizontal members having notches or orifices, and two or more vertical members having a profile and configured for support in the notches or orifices of the horizontal members, wherein the horizontal members are configured for mounting in a horizontal orientation and the vertical members are configured for mounting in a vertical orientation, the vertical members also having a portion for mounting in the notches or orifices of the horizontal members, and the vertical members are configured for supporting photographs.

Another embodiment of the invention is a system for supporting photographs. The system includes at least one horizontal member, two or more vertical members, and two or more connection studs, wherein the at least one horizontal member is configured for mounting in a horizontal orientation and the vertical members are configured for mounting in a vertical orientation, wherein the connection studs are configured for slidingly coupling the vertical members to the at least one horizontal member, and wherein the vertical members are configured for supporting photographs or other objects for display.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
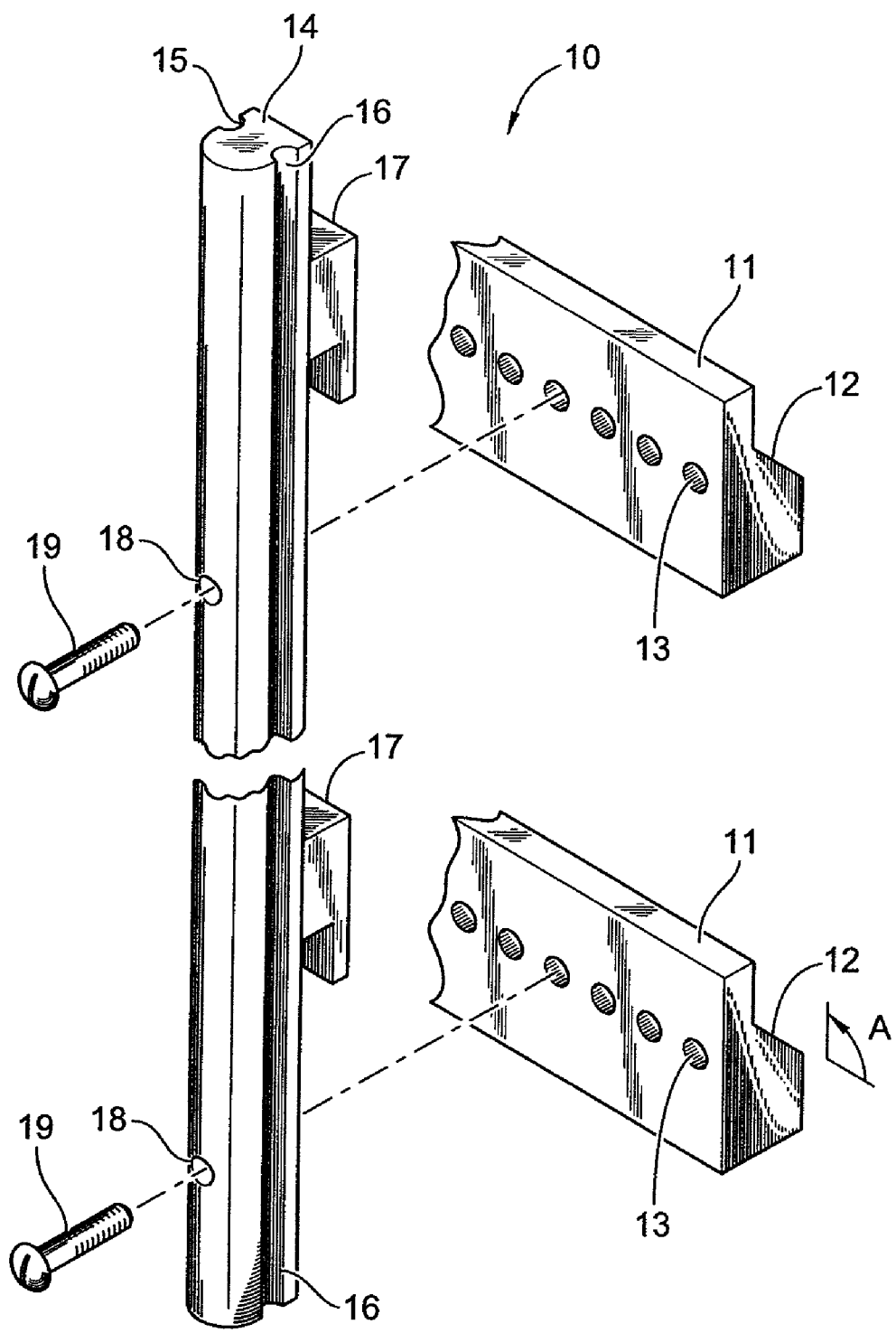
FIG. 1 is a perspective view of a first embodiment of the invention.

There are many ways to use this invention, a few of which are described below. FIG. 1 illustrates a first embodiment of a system 10 for supporting and displaying photographs. The system includes two or more horizontal members 11, each of which has a continuous horizontal notch 12 and two or more drilled holes 13. It is preferred that two horizontal members 11 are used to support each vertical member 14, as shown. The horizontal members 11 are fastened to a wall (not shown) with anchors, screws, or other fasteners that are inserted through holes 13. The continuous notches 12 of the horizontal members provide a space adjacent the wall for a tab 17 from two or more vertical members 14. The notches may be made at a right angle to the vertical, or may be made at an angle A, such as a 45° angle to the horizontal, as shown.

Vertical members 14 preferably include notches 15, 16 on either side. The notches are preferably continuous vertical notches along the length of the vertical member. Because the notches in the horizontal members are continuous, the vertical members may be placed at any point along the length of the horizontal members. That is, the horizontal members are configured so that the placement of the vertical members may be adjusted horizontally as desired, in a continuously variable manner. Using the vertical supports, photos may then be supported on their sides, rather than on the top and bottom of the photos. In addition, the supports may be adjusted, both horizontally and vertically, as desired, for placement of the photos as desired. If desired, the vertical members 14 may also be stabilized by drilling holes 18 and securing the vertical members to the horizontal members 11 with fasteners 19.

Tab 17 may be integrally formed with vertical member 14, or may be formed by assembling tab 17 into vertical member 14. For example, if vertical members 14 are made of wood or plastic, the tab may be machined or molded as part of the vertical member. Alternatively, the tab may be fastened to the vertical member, as by a screw or a nail, or may be snap-fit into the vertical member if plastic parts or other suitable materials are used. In use, two or more horizontal members 11 may be placed horizontally on a wall, separated by a suitable vertical distance. Vertical members 14 are then placed on the display, separated by a suitable horizontal distance, each vertical member supported by at least one, and preferably two or more, horizontal members. The intended use of the system is to support photos, or other objects, that are very light in weight. Thus, in general, the system will weigh much more than the photos or other objects that the system in intended to support and display. The vertical members thus may only need support from a single horizontal member, although the use of two horizontal members is preferred. The horizontal members 11, however, preferably have a plurality of orifices 13 from which to choose two or more for supporting the horizontal members on a wall or other vertical display surface.

Figure 2:
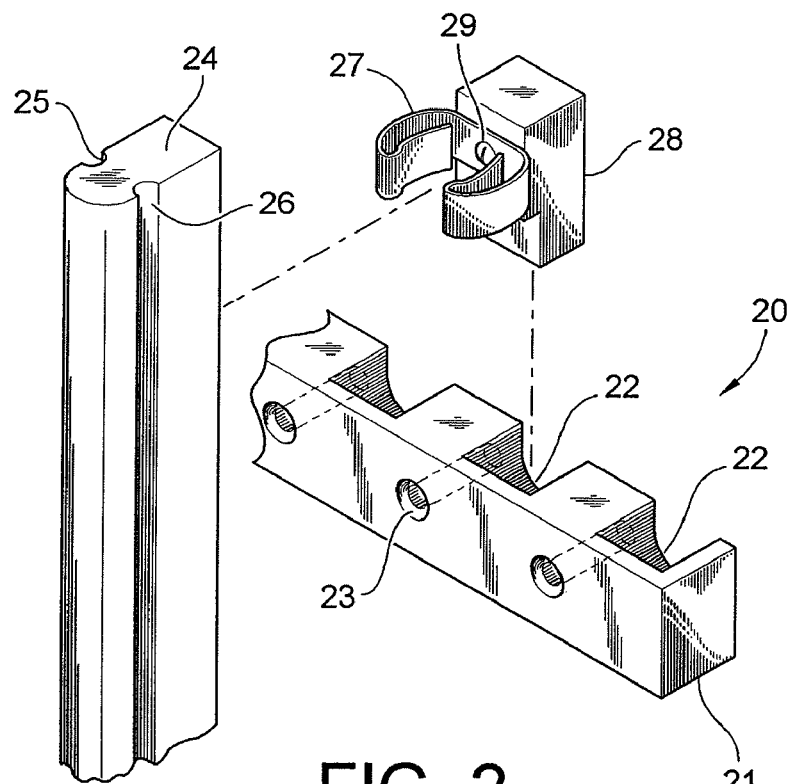
FIG. 2 is an exploded view of a second embodiment.

FIG. 2 illustrates a second embodiment of components useful in a display system 20. In this embodiment, horizontal members 21 have discrete notches 22 instead of a continuous notch as in the previous embodiment. The horizontal members 21 also have drilled holes 23 for fastening to a vertical display surface, such as a wall. The vertical members 24 include continuous vertical notches 25, 26. Each vertical member is secured to one or more horizontal members using one or more clamps 27, tabs 28, along with fasteners 29 that secure each clamp 27 to tab 28. Clamp 27 is preferably a flex spring clamp, such as a hose clamp or a spring steel clamp. These clamps are typically made from thin spring steel or flexible plastic. The clamp may then be mounted to the appropriate position on the vertical member 24, and the clamp is secured to the horizontal member 21 by placing tab 28 into the desired notch 22. Alternatively, the tab 28 may fit very tightly into notch 22, and the vertical member may then be joined to clamp 27 at the desired vertical (up and down) position or height. Thus, the tab and clamp may be part of the horizontal member or the vertical member.

In the embodiment of FIG. 2, the horizontal adjustment of the vertical members is limited to the discrete positions of the notches 22. However, if the clamps are secured to the horizontal members, such as by fitting tightly into the chosen notch, then the vertical position (up and down) of the vertical member may be adjusted as desired by a large amount or by an infinitesimal amount. That is, the vertical position of the vertical members is continuously variable, by adjusting their position as held by the clamps, rather than being limited to adjustment of discrete amounts, e.g., the horizontal position of the vertical member.

Figure 3:
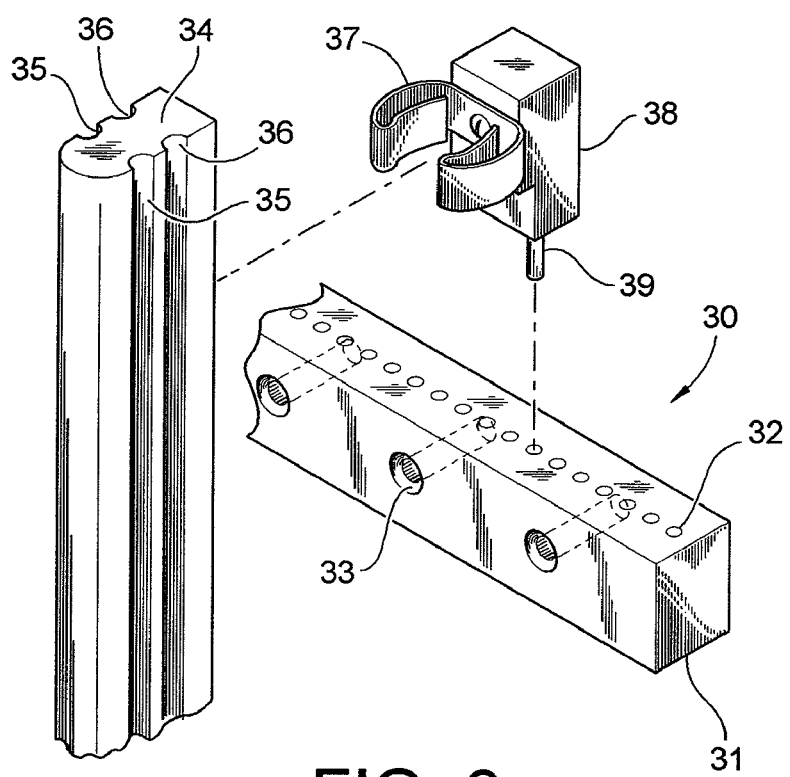
FIG. 3 is an exploded view of a third embodiment.

An exploded view of another embodiment is depicted in FIG. 3. In this embodiment, the supporting system 30 includes horizontal members 31 and vertical members 34. The horizontal members 31 include a first plurality of orifices 32 for supporting vertical members 34 and a second plurality of orifices 33 for attaching horizontal members 31 to a display surface, such as a wall. Vertical members 34 include two forward notches 35 which are preferably continuous vertical notches, for supporting and displaying photographs or other objects. The vertical members also include two additional continuous vertical notches 36 toward the rear of the vertical members. In the preferred method of using this embodiment, each vertical member includes one or more clamps 37 which grasp the vertical member securely using notches 36. Each clamp 37 is fastened or otherwise attached to an attachment member 38 and a tab 39. Tab 39 supports the vertical member 34 when tab 39 is inserted into one of the orifices 32. If the tabs and attachment members are secured to the horizontal members 31, then the vertical position of the vertical member is continuously adjustable through clamp 37, similar to the adjustment described for FIG. 2.

Figure 5:
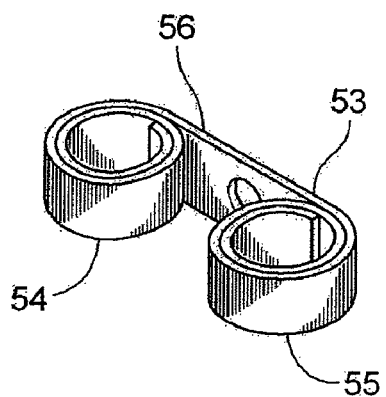
FIG. 5 depicts an additional clamp useful in embodiments of the invention.
Figure 6:
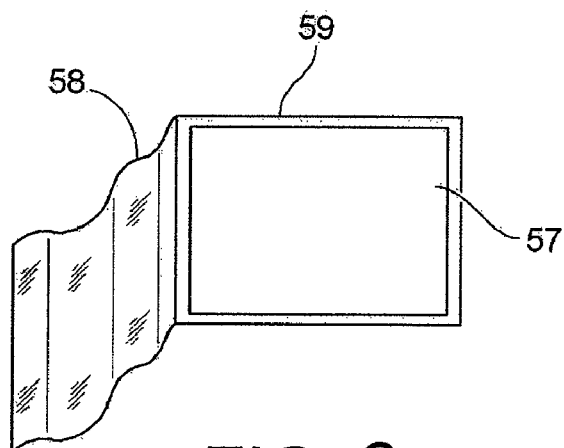
FIG. 6 illustrates a photograph and backing useful in the above embodiments.

Attachment member 38 may be fastened to clamp 37 with a fastener, such as a screw. Attachment member 38 may be made from plastic or wood, and may include an integral tab 39, as when the two are machined from wood or injection molded from plastic. Clamp 37 is preferably a flex-type spring, such as a constant-force clamp, or may be any other suitable clamp or spring useful for attaching the vertical member to the attachment member 38 and tab 39. As noted, the vertical position of the vertical members is infinitely adjustable using clamp 37. Another embodiment of one such constant-force clamp is disclosed in FIG. 5. Clamp 53 is made from spring steel, or a plastic strip, gathered into two coils, 54, 55, which exert a closing force that holds an object, such as a vertical member, between the coils. Clamp 53 may be secured to a horizontal member or to a tab by a fastener in the backing coil 56. Twin-spool clamps such as these may be made from spring steel coils, available from Sandvik Materials Technology, Scranton, Pa., and known as twin-spool A-motor springs. The clamps may be made from spring wire or other materials available from other manufacturers in other configurations.

Figure 4:
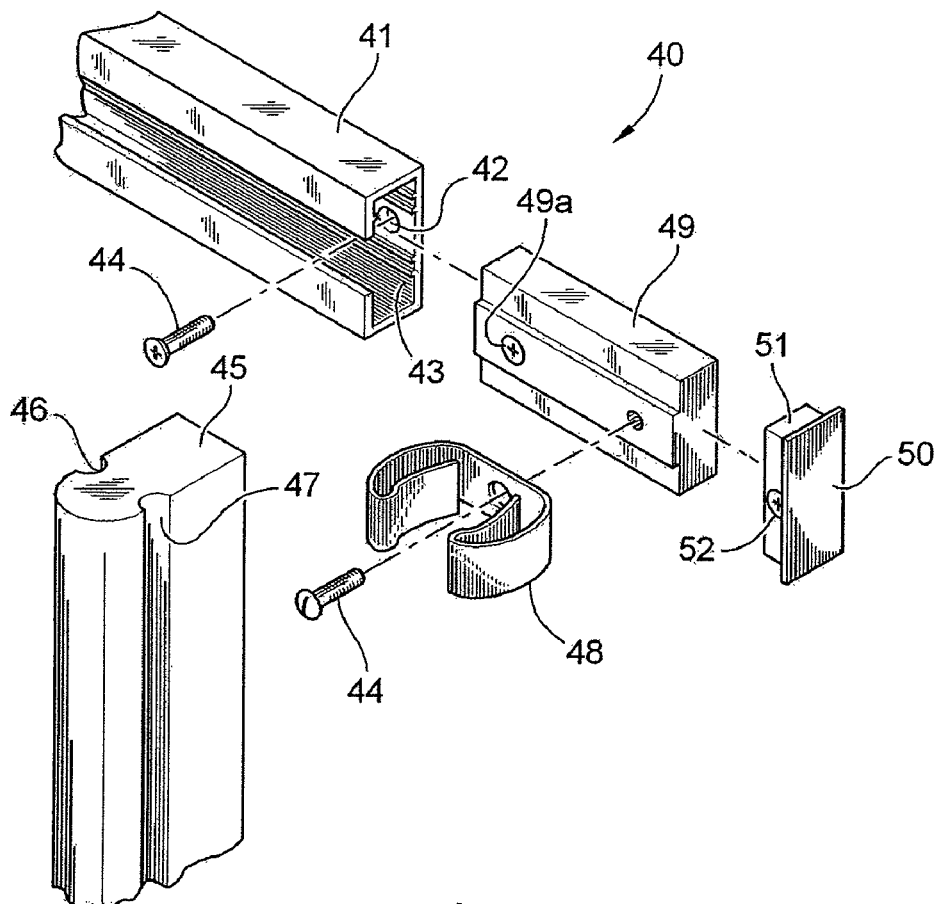
FIG. 4 is an exploded view of a fourth embodiment.

The horizontal members need not be solid, as shown in the above embodiments, but may be made from a hollow type of construction member, such as a channel. FIG. 4 depicts an embodiment in which the display system 40 includes horizontal members made of hollow channels 41, the channels having a cross-section in the general shape of a capital "C." Other channels may have cross-sections in the general shape of a capital "U" on its side. The web 43 of horizontal member channel 41 has a plurality of holes 42 from which to choose when using fasteners or screws 44 to attach the horizontal members to a wall or other surface. Instead of screws, standard wall anchors may be used.

In this embodiment, the horizontal members add tabs 49 that are held within the hollow portion of the channel. Tab 49 may be secured in place by set screw 49a, or similar locking device, that secures tab 49 to channel 41. Each tab 49 is attached to a clamp 48, using a fastener 44 or other device. The clamp is suitable for securely grasping a single vertical member 45. Vertical member 45 includes two grooves 46, 47, for securing photographs in grooves of adjacent vertical members. There may also be an end cap 50 for each end of the horizontal members. End cap 50 may include an inner tab 51 with an orifice 52 for securing the end cap to the channel 41 or to the wall, as desired. The end cap may prevent scratches or cuts if the channels used as horizontal members have sharp edges or cutting surfaces.

Because the inner portion of channel 41 is hollow, the horizontal position of tab 49 is infinitely adjustable. Since the position of tabs 49 determines the horizontal position of the vertical members 45, the horizontal positions of the vertical members is thus infinitely adjustable. As described previously, the vertical positions of the vertical members is also infinitely adjustable, since the clamps 48 allow easy adjustment of the vertical position of the vertical members. Thus, in this embodiment, the vertical members are easily adjusted in both vertical and horizontal directions, making for easy adjustments of photo displays. This may be important when changing displays and when using photographs of more than one size, such as 4 inches×6 inches, 8 inches by 10 inches, or 5 inches×7 inches. Other sizes are also envisioned.

Embodiments may be used to develop pleasing displays of a multitude of photographs, as shown in FIGS. 6-9. The displays use a multitude of photographs, supported in the grooves of vertical members. Vertical members are in turn supported as shown above by horizontal members, the horizontal members secured to the wall on which the display is desired. Each photo 57 may be displayed as printed. Alternatively, the photograph 57 may be given a backing 59 in order to provide a stiffer and more readily handled photograph. Examples of backings suitable for 5×7 inches or other size photographs include polystyrene that is 0.030 inches thick (30 mil polystyrene) with a clear plastic cover 58. The photos may be mounted using adhesive suitable for photographs, such as Photo Mount Adhesive from the 3M Company, Minneapolis, Minn., U.S.A. This backing has proven useful in mounting photographs on our prototypes. For larger photographs, such as enlargements that are 20 inches by 30 inches, a stiffer backing may be obtained by using a thicker polystyrene, such as 0.060 inches thick (60 mil). Other materials and thicknesses may be used. One such other material includes Biaxially-Oriented Polyethylene Terephthalate (boPET), for use if a lighter and thin (approximately 0.25 mm) polyester film is necessary for an application. Backings which are reusable and which have little shape memory are useful.

Figure 7:
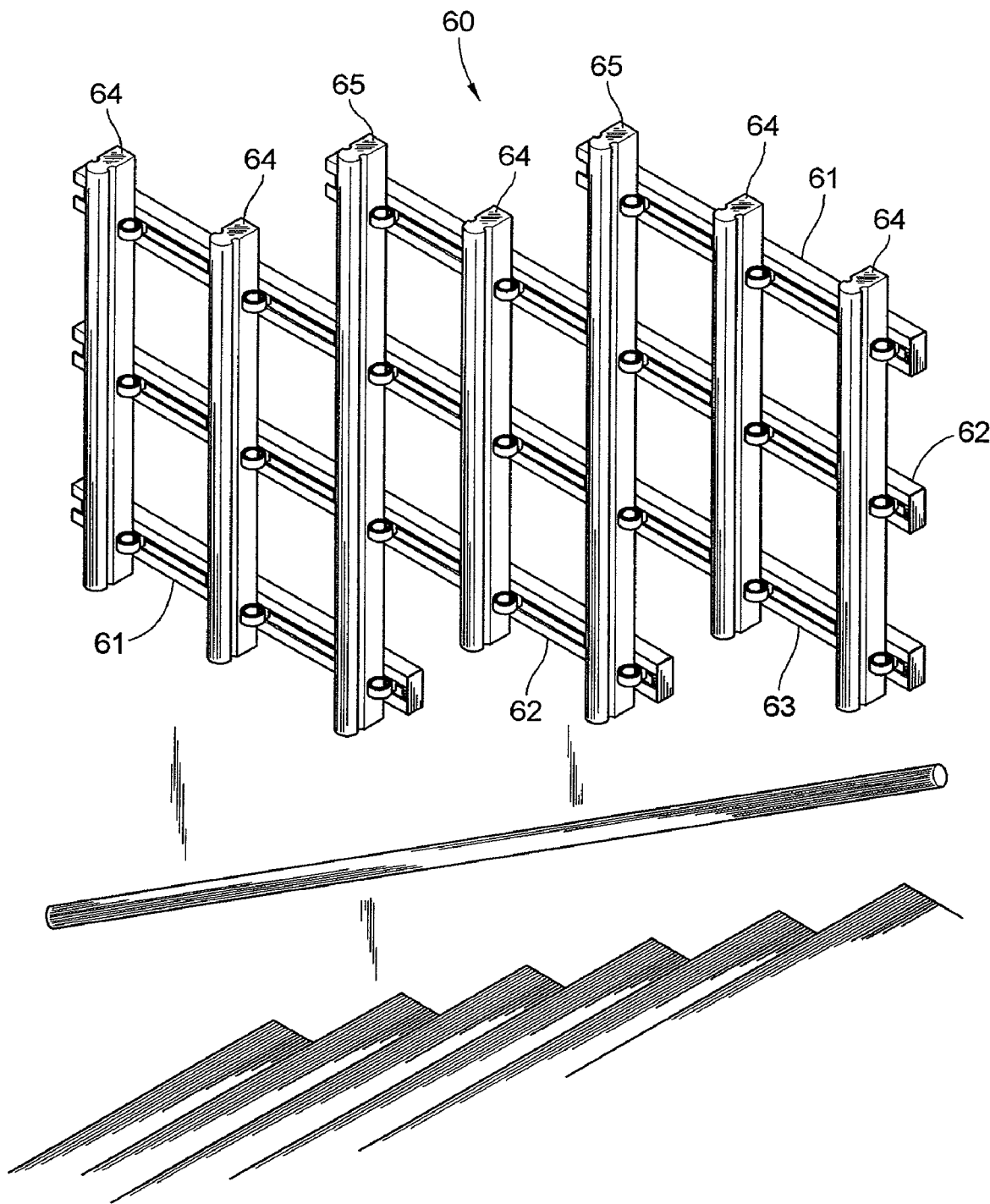
FIGS. 7-8 are views showing how photographs may be displayed with any of the above embodiments.

FIG. 7 depicts an embodiment in which the vertical and horizontal members described above may be used to fabricate a photographic display 60 near a staircase. In this embodiment, the display advances upwards and to the right in steps that match those of a standard staircase, about eight inches of rise for every ten inches of run. The display includes two short horizontal members 61, two longer horizontal members 62, and a middle, very long horizontal member 63. These horizontal members support five shorter vertical members 64 and two longer vertical members 65. The clamps and tabs as described above are used to hold the vertical members. One example is a series of photos that are 8 inches high by 10 inches wide. This is only one example of the ways that the above components may be joined to create a pleasing and structurally sound display.

Figure 8:
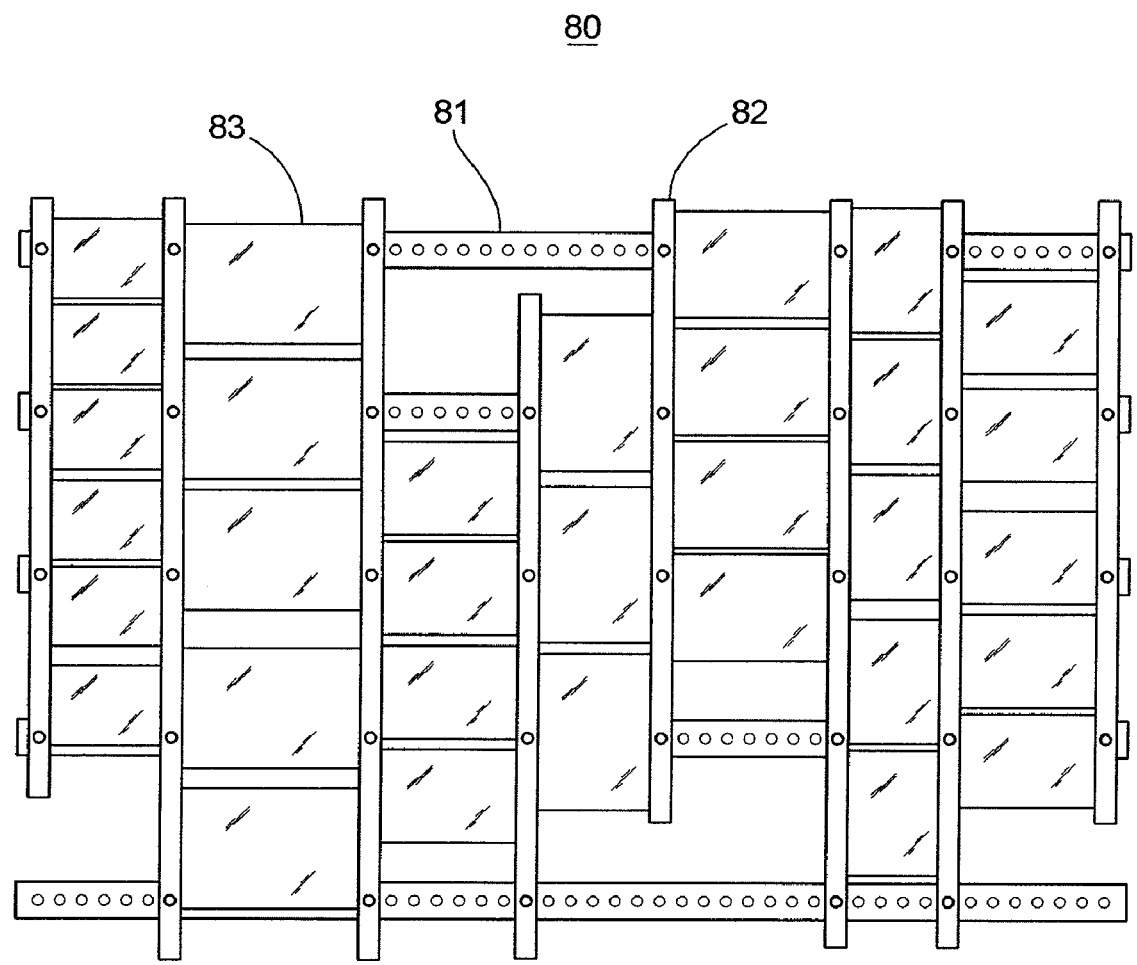
Figure 9:
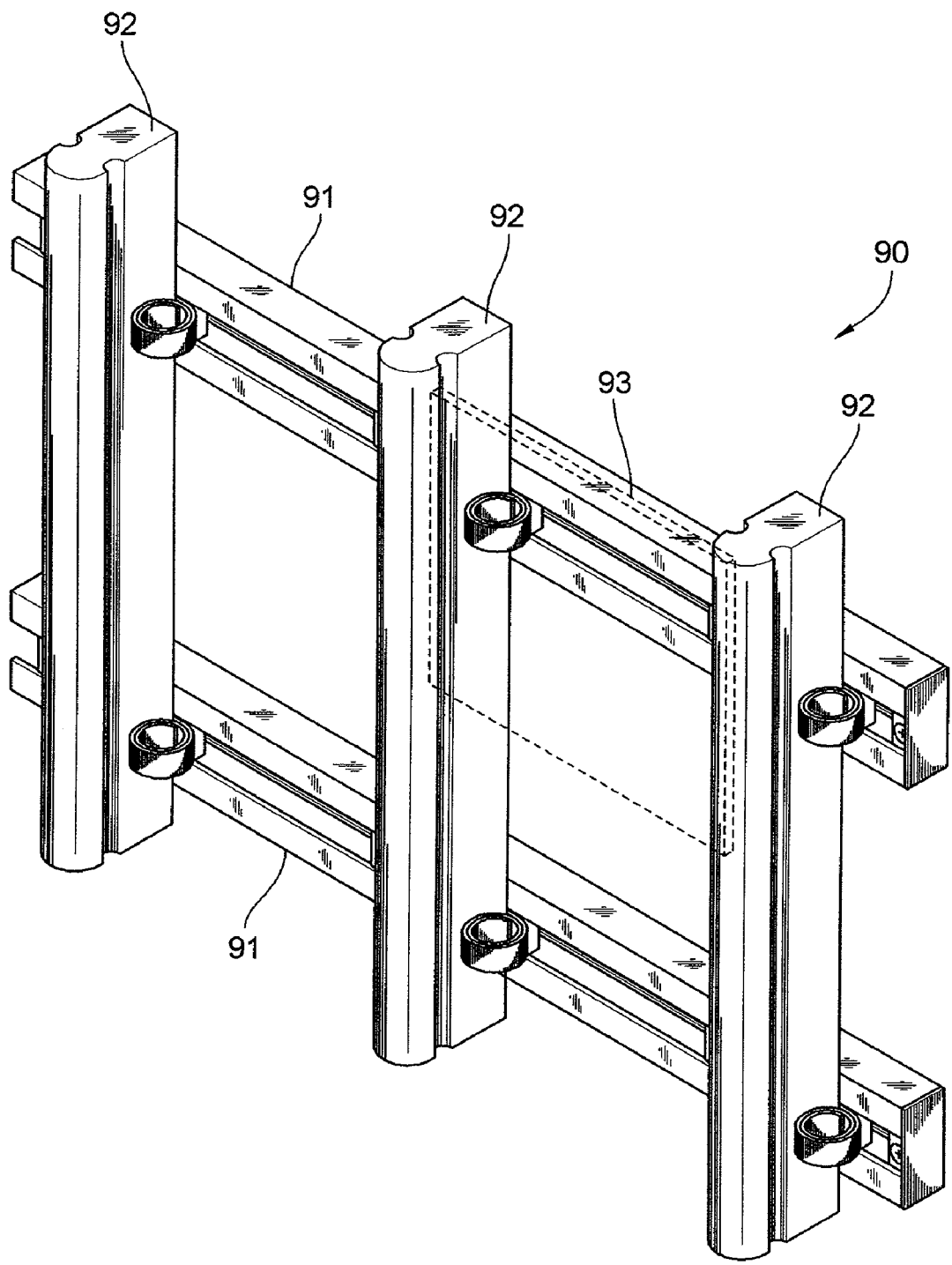
FIG. 9 illustrates an additional embodiment.

FIGS. 8-9 disclose additional displays using the hardware described above. FIG. 8 uses a more-or-less random distribution, in which display 80 uses a plurality of horizontal members 81 and vertical members 82, to support and display a plurality of photographs 83. In this embodiment, the photographs are displayed in vertical columns with somewhat random placement, with not every column having a complete column of photos and not every row including a complete row of photos. As can be seen in the photo, some of the rearward horizontal members may be seen, and some of the vertical members do not have a complete column of photos, allowing passers-by to see some portions of the horizontal and vertical members.

It is preferred, for obvious reasons, to conceal the presence of the horizontal and vertical members as much as possible. One embodiment of a display 90 in which this is accomplished is disclosed in FIG. 9. Display 90 includes only a single row of horizontal photos 93. The display is made from two horizontal members 91 that support three vertical members 92. The vertical members support photos 93 as described above. With careful placement, the horizontal members 91 may be hidden behind the vertical members 92 and the photos 93, the horizontal members not easily visible. This creates a more elegant display, which is further improved if the photos 93 are placed slightly more closely together than their horizontal length, resulting in a slightly concave configuration (bowed outward) that is more visually pleasing. Another embodiment uses only a single horizontal member 91, with the vertical members as shown, for a single row of photos, although taller vertical members would also allow for more than a single row. In general, the vertical members will be visible, because the vertical members directly support the photos for display, preferably by using vertical notches as discussed above.

Figure 10A:
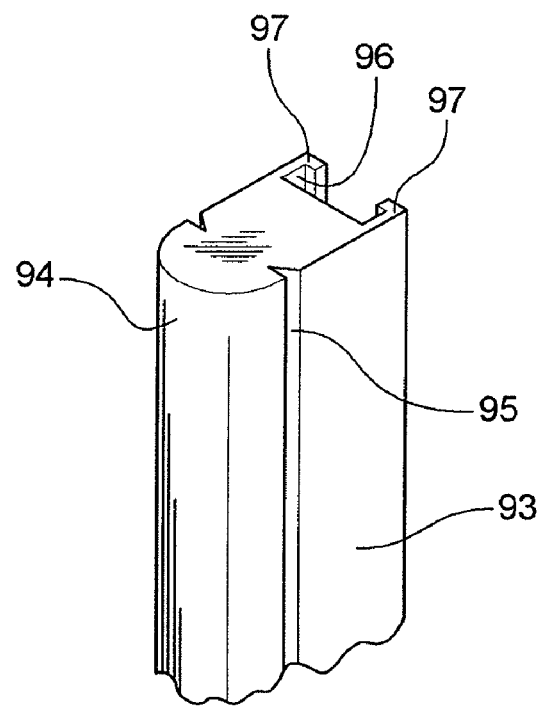
FIGS. 10a-10b illustrate a swiveling clamp useful in several embodiments.

Besides the clamps described above, other clamps may be used to secure the vertical members to the horizontal members. FIG. 10a depicts a cross-section of a vertical member 94 which is adapted for use with a spring clamp having external leaf springs to grip both vertical member 93 and the horizontal members described above, particularly the hollow embodiments, such as a horizontal channel. Vertical member 93 includes a front portion 94 with two vertical notches 95 for holding photos. The rear portion of the vertical member includes a vertical hollow 96 for holding a spring clamp, described below. Rear portions 97 complete the vertical member and help to secure the spring clamp.

Figure 10B:
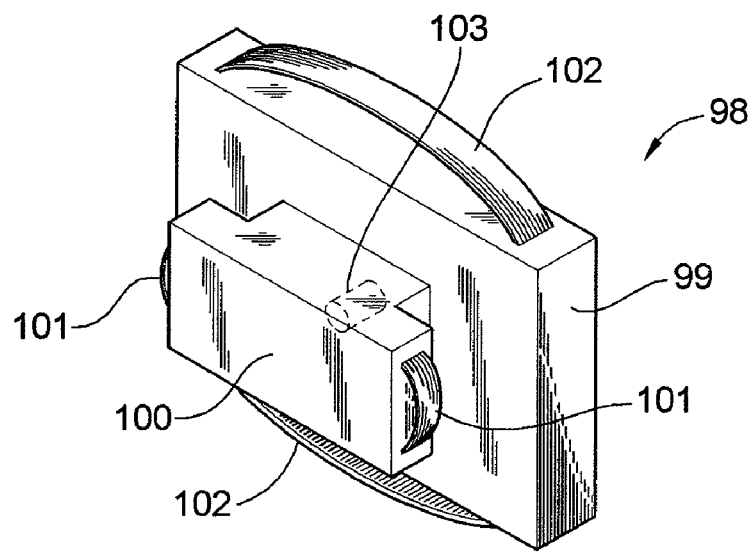

A spring clamp 98 is described in FIG. 10b. The clamp includes two portions, a rear portion 99 for mounting within a hollow horizontal member, and a forward portion 100 for mounting within a hollow vertical member, or a vertical notch or hollow of a vertical member, as shown in FIG. 10a. The rear and forward portions 99, 100 are swivelingly or rotatably joined by a pin 103. The rear portion 99 is held by two transverse horizontal leaf springs 102, which securely hold the spring clamp. The forward portion 100 is held within the vertical member by two transverse vertical leaf springs, which hold the clamp sufficiently securely to also hold the vertical member and the photos mounted in the forward notches of the vertical member. Because the pin allows the rear and forward portions to rotate or swivel with respect to each other, the vertical members may mount to the horizontal members at an orientation other than 90°. The position of this clamp within the horizontal member is continuously adjustable, as is the placement of the clamp with respect to the vertical members.

Figure 11:
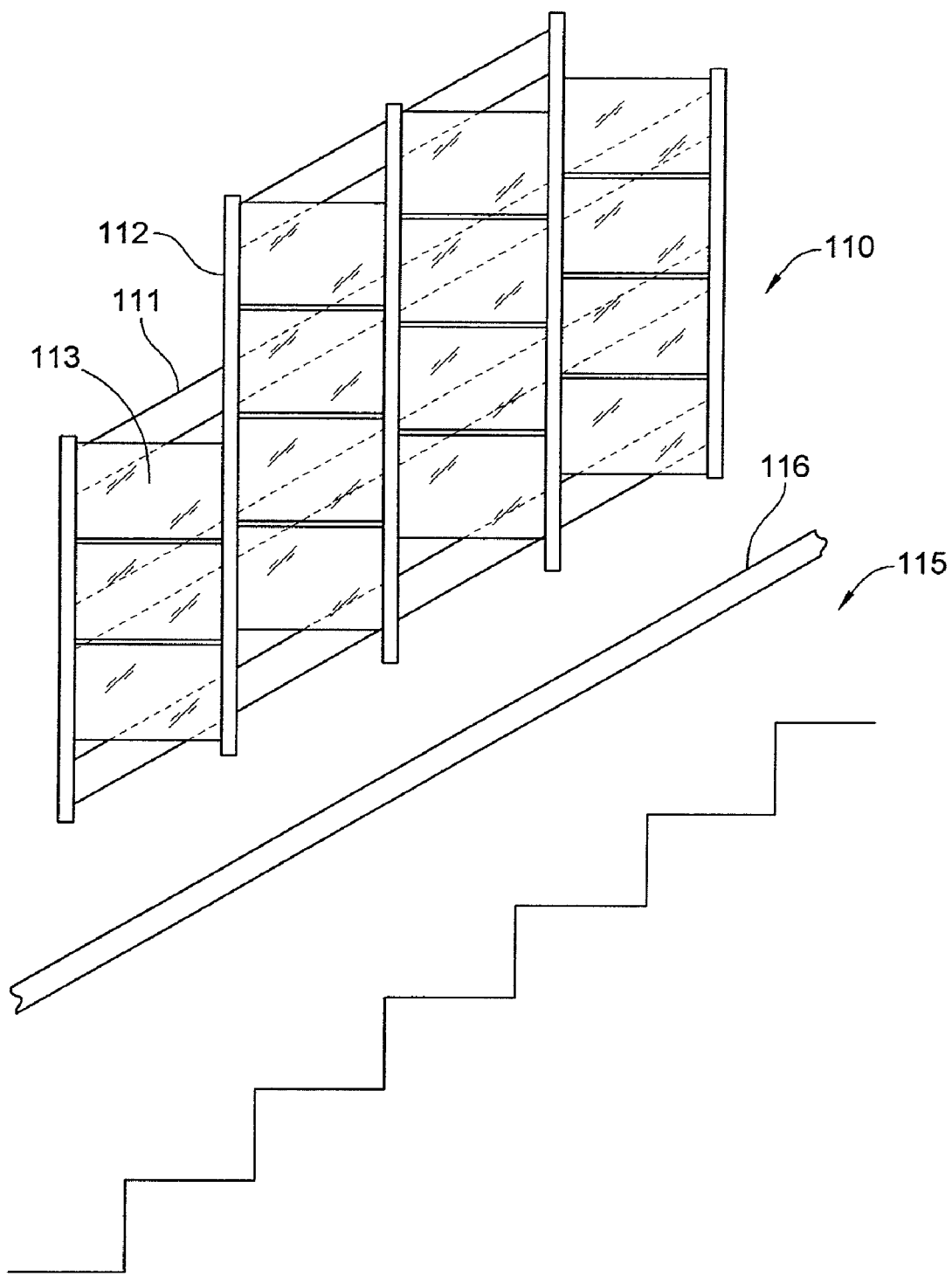
FIG. 11 illustrates a swiveling clamp arrangement.

An embodiment which may take advantage of the ability of the clamps to swivel is depicted in FIG. 11. A photo arrangement 110 is made from a plurality of horizontal members 111 and a plurality of vertical members 112. In this arrangement, by a stairs 115, the "horizontal" members are oriented at about 35-40 degrees to the horizontal, which is close to the normal angle of stairs, about 10 inches run for every 8 inches of rise. This creates a pleasing effect with the "horizontal members" 111 roughly parallel to the stairs 115 and stair rail 116. While this orientation of members 111 is not strictly "horizontal," the orientation is primarily horizontal, in that the members 111 are oriented to the vertical members 112 by an angle of less than 45°. As described above, the vertical and horizontal members are securely joined by swiveling clamps. Other angles are possible, within the limits of the particular clamp selected.

Figure 12:
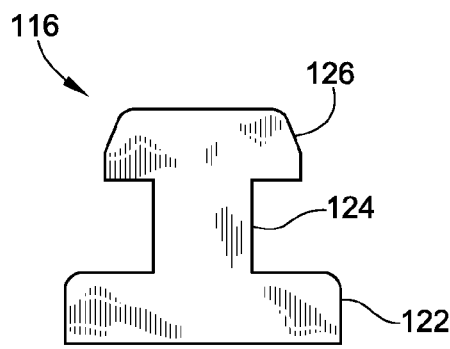
FIG. 12 illustrates a side view of a connection stud.

A further set of alternate embodiments is illustrated in FIGS. 12-18. A connection stud 116 is configured to slidably couple a horizontal member 118 to a vertical member 120. In one embodiment, as illustrated in FIG. 12, the connection stud 116 has a discoidal base portion 122, a post portion 124, and a discoidal top portion 126, the discoidal top portion 126 having a diameter smaller than the diameter of the discoidal base portion 122.

Figure 13:
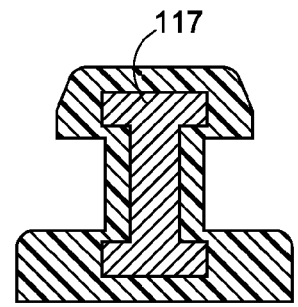
FIG. 13 illustrates a side cross-section of a reinforced connection stud.

The connection stud 116 may be constructed from plastic, metal, composite, wood, or other materials, or a combination thereof. The connection stud 116 may also be constructed to include a body of material such as plastic surrounding a metal core support 117, as illustrated in FIG. 13, to give the connection stud 116 a more sturdy, durable, and resilient construction. The discoidal base portion 122 of the connection stud 116 may be of solid construction, or may be formed with recess apertures in its surface, providing a construction that requires use of less material and provides superior flexibility. Other constructions are also envisioned.

Figure 14:
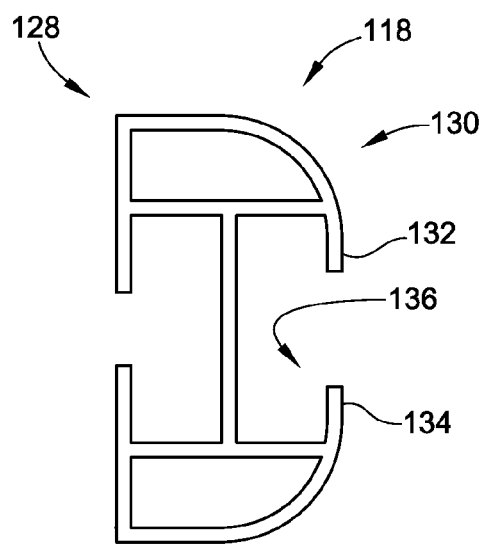
FIG. 14 illustrates a cross-section of a horizontal member.

FIG. 14 illustrates a cross-section of the horizontal member 118. The horizontal member 118 includes a wall mounting side 128 and a vertical member mounting side 130. The wall mounting side 128 allows for attachment to a wall or any other mounting surface. The vertical member mounting side 130 includes an upper lip 132 and a lower lip 134 which define a horizontal sliding aperture 136. Horizontal sliding aperture 136 is configured to receive and slidingly engage the base portion 122 of the connection stud 116. The sliding aperture 136 and the discoidal base portion 122 and post portion 124 of the connection stud 116 are sized so that the connection stud 116 is snugly retained with the horizontal sliding aperture 136, while still allowed to be selectively slidingly configured to any position along the horizontal member 118. As a result of this construction, the horizontal and vertical leaf springs 101, 102 required in the spring clamp 98, for example, (described above in relation to FIGS. 10A and 10B) can be eliminated.

Figure 17:
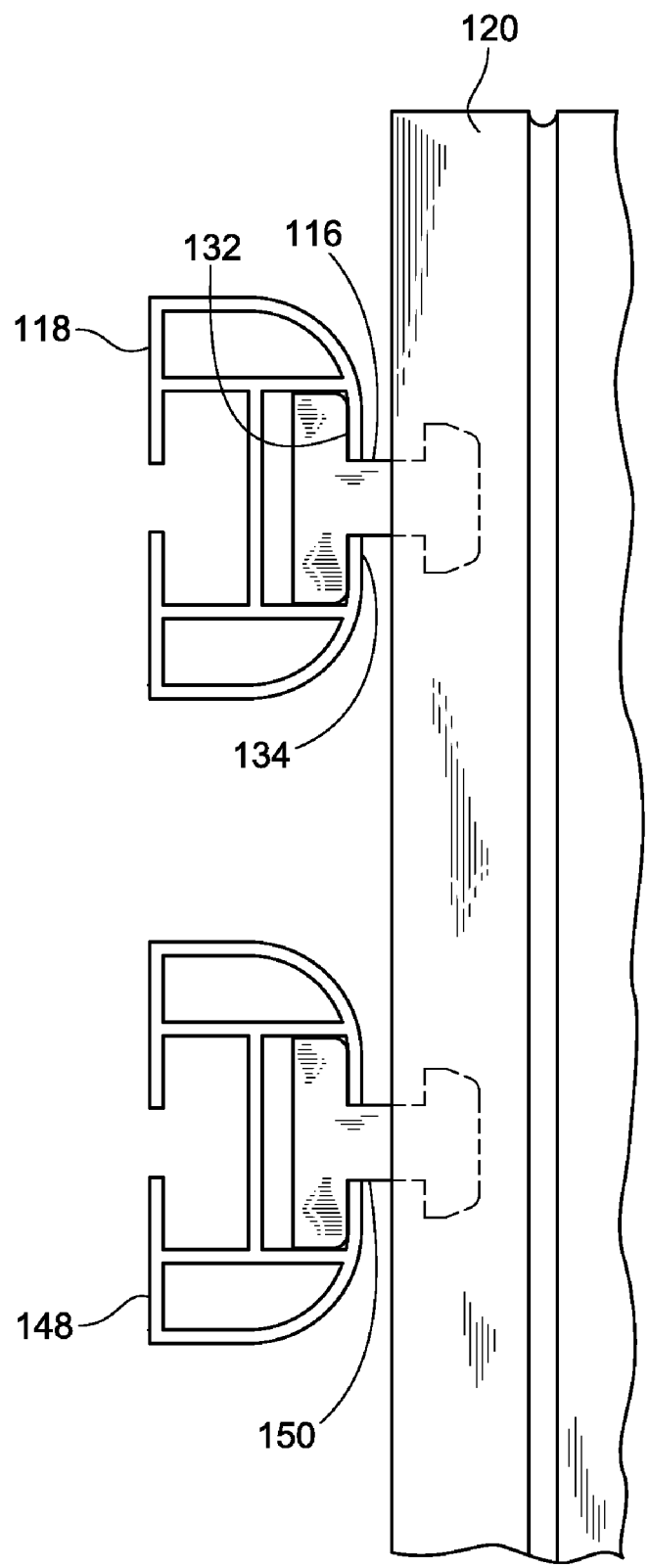
FIG. 17 illustrates a partial cross-section of a vertical member coupled to two horizontal members using two connection studs.

With reference to FIGS. 14 and 17, in one embodiment, the upper lip 132 and lower lip 134 of the horizontal member 118 are spaced a distance apart, this distance being slightly less than the width or diameter of the post portion 124 of the connection stud 116. This sizing allows the upper lip 132 and lower lip 134 to snugly grip the post portion 124, while still allowing the connection stud 116 to be selectively slidingly configured to any position along the horizontal member 118. The connection stud 116 is also snugly retained within the horizontal sliding aperture 136.

Figure 15:
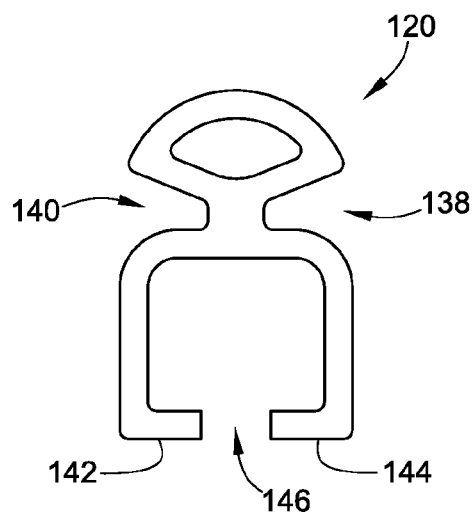
FIG. 15 illustrates a cross-section of a vertical member.

FIG. 15 illustrates a cross-section of an embodiment of the vertical member 120 having continuous vertical support notches 138, 140 for engaging and supporting photographs or other display objects. The vertical member 120 also includes a first vertical sliding lip 142 and a second vertical sliding lip 144 defining a vertical sliding aperture 146. The vertical sliding aperture 146 is configured to slidingly engage and snugly retain the discoidal top portion 126 of the connection stud 116. The vertical sliding aperture 146 and the discoidal top portion 126 of the connection stud 116 is snugly retained within the vertical sliding aperture 146, while still allowed to be selectively slidingly configured to any position along the vertical member 120.

Figure 16:
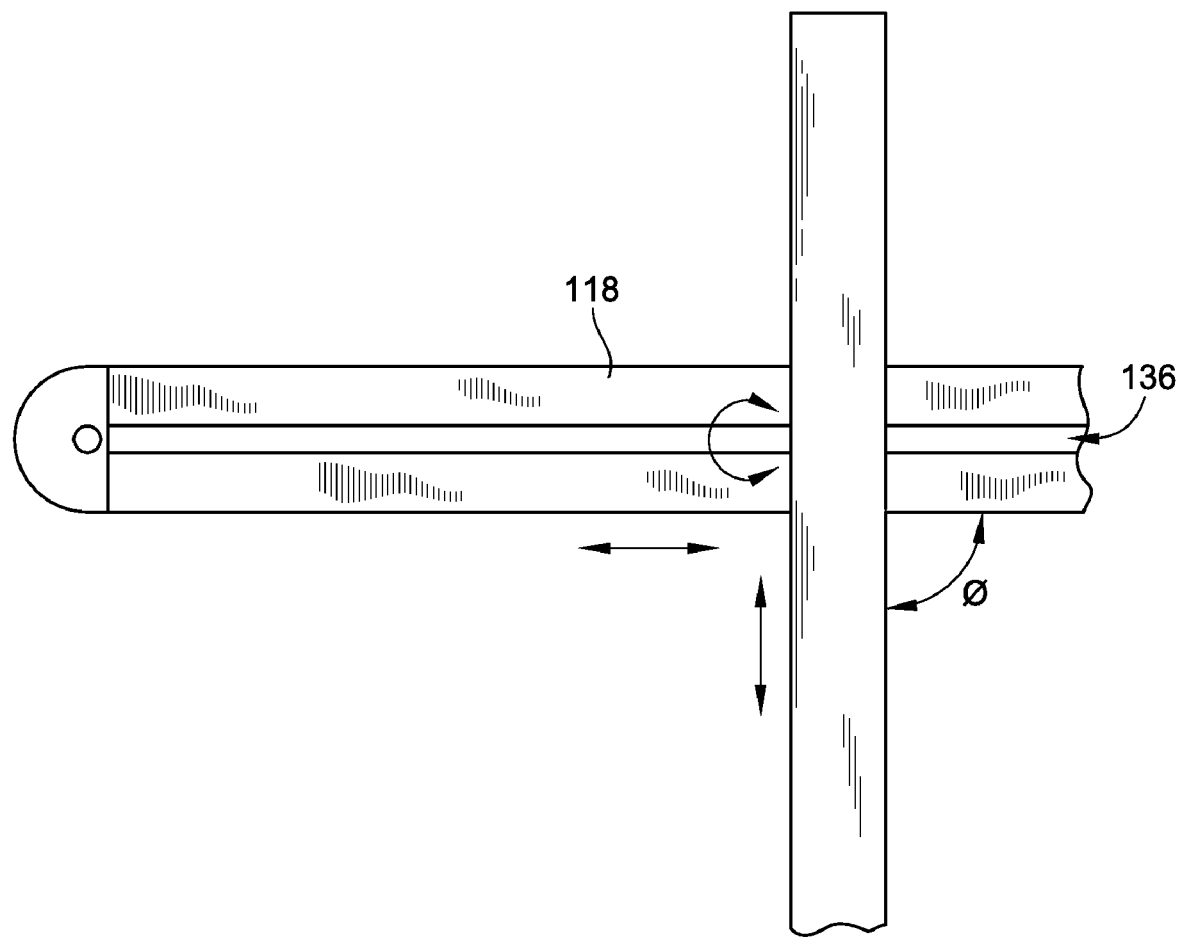
FIG. 16 illustrates a plan view of the range of motion of a vertical member relative to a horizontal member.

Based on this construction, when a horizontal member 118 and a vertical member 120 are slidingly coupled using a connection stud 116, the vertical member 120 may be selectively slidingly horizontally configured at any horizontal location along the horizontal member 119, and may be selectively slidingly vertically configured up or down along the vertical member's 120 own length, as illustrated in FIG. 16.

However, because the connection stud 116 (not shown in FIG. 16) of this embodiment has a discoidal top portion 126 and a discoidal base portion 122, the vertical member 120 may be rotated around the connection stud 116, varying the angle θ between the horizontal member 118 and the vertical member 120.

If it is desired that the angle θ remain constant, the vertical member 120 may be coupled to a second horizontal member 148 using a second connection stud 150. Thus, the vertical member 120 is prevented from rotating around either of the connection studs 116, 150 by the other of the connection studs 116, 150, maintaining the angle θ between the horizontal member 118 and the vertical member 120, while still allowing the vertical member 120 the full range of horizontal and vertical sliding motion.

Figure 18:
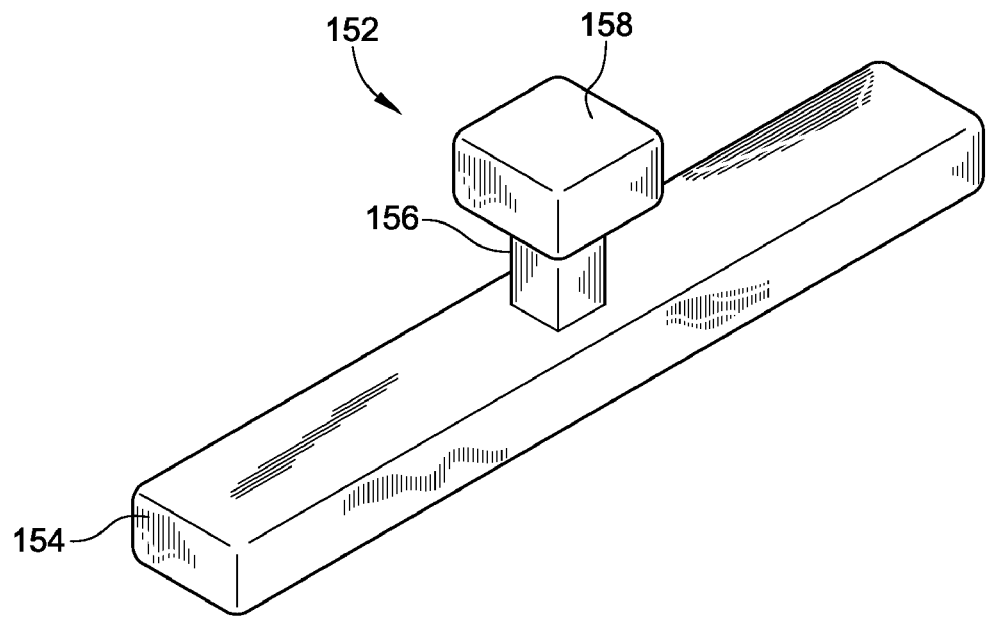
FIG. 18 illustrates an isometric view of a second embodiment of a connection stud.

Another embodiment of the present invention provides an alternate mechanism for maintaining a constant angle θ between the horizontal member 118 and the vertical member 120 without the use of a second horizontal member 148 and second connection stud 150. As illustrated in FIG. 18, a second embodiment of a connection stud 152 has an elongated, rectangular bottom portion 154 coupled to a rectangular top portion 158 by a post portion 156. The elongated, rectangular bottom portion 154 and the rectangular top portion 158 are again sized to be slidingly received and snugly retained by a horizontal member 118 and a vertical member 120 respectively, as in the previous embodiment, allowing a full range of horizontal and vertical sliding motion of the vertical member 120 relative to the horizontal member 118. However, due to the shape of the elongated, flat surfaces of the rectangular bottom portion 154 and the rectangular top portion 158, interact with internal walls of the horizontal and vertical members 118, 120 in such a manner that the vertical and horizontal members 118, 120 and the connection stud 150 are all precluded from rotating with respect to one another. As a result of this construction, the vertical member 120 is prevented from rotating around the second embodiment of the connection stud 152 relative to the horizontal member 118 because the elongated rectangular bottom portion 154 is not allowed to rotate in the horizontal sliding aperture 136 and the rectangular top portion 158 is not allowed to rotate in the vertical sliding aperture 146. Therefore, the angle θ between the horizontal member 118 and the vertical member 120 is maintained.

This embodiment eliminates the need for a second horizontal member 148 and second connection stud 150 while still allowing the angle θ between the horizontal member 118 and the vertical member 120 to be maintained. The exemplary embodiment of the connection stud 150 shown in the drawings and described herein is configured for maintaining the horizontal and vertical members 118, 120 at a constant angle θ of substantially ninety degrees. It is contemplated that in other embodiments of the invention a connection stud in accordance with the invention may be configured to maintain the angle θ at a desired constant orientation other than ninety degrees.

Figure 19:
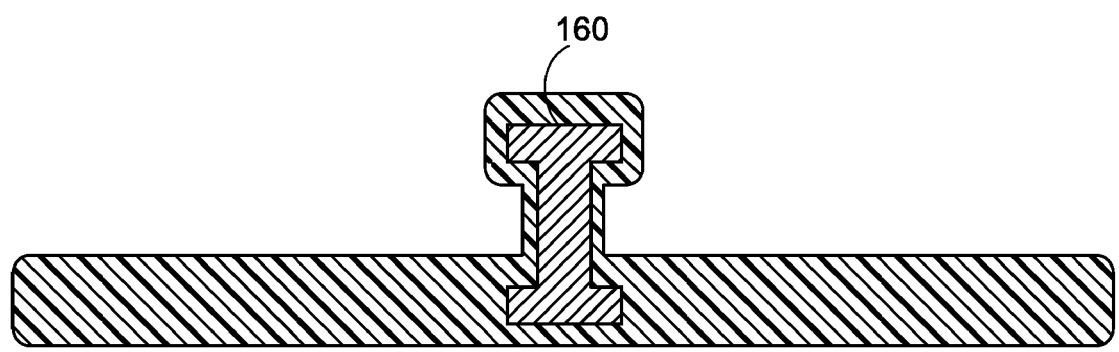
FIG. 19 illustrates a side cross-section of a reinforced second embodiment of a connection stud.

FIG. 19 illustrates that the second embodiment of the connection stud 152 may also be constructed to include a body of material such as plastic surrounding a metal core support 160, to give the second embodiment of the connection stud 152 a more sturdy, durable, and resilient construction.

It will also be appreciated by those having skill in the art, that in other embodiments of the invention where it is desired to preclude rotation of the connection stud or to maintain a constant angle θ, between the horizontal and vertical members, a connection stud according to the invention may have only one flat surface, or more flat surfaces than the rectangular shaped portions of the exemplary embodiment of the connection stud 150 described herein. For example, an otherwise discoidal shaped top or bottom portion of a connection stud might include a single flat side for interaction with one or the other of the vertical and horizontal members. In other embodiments, one or the other of the top and bottom portions of a connection stud according to the invention might be shaped as a pentagon, octagon, hexagon, or any other appropriate shape having multiple flat sides.

In other embodiments of the invention, it is further contemplated that connection studs, according to the invention, may take a variety of shapes and have proportions other than those specifically described and illustrated herein with respect to the exemplary embodiment of the connection studs 116, 150, 152. For example, the relative sizes of the top portions 126, 158 and the base portions 122, 154 of the connection studs 116, 152 may vary. In some embodiments, a base portion 122, 154 may be larger to much larger, i.e. have a larger to much larger radius if the base portion is discoidal or a larger to much larger width if the base portion is rectangular, than a top portion 126, 158. Conversely, a base portion 122, 154 may be smaller to much smaller, i.e. have a smaller to much smaller radius if the base portion is discoidal or a smaller to much smaller width if the base portion is rectangular, than a top portion 126, 158. A base portion 122, 154 might also be the same size as a top portion 126, 158. A base portion also need not be the same shape as a top portion 126, 158. For example, a connection stud might have a discoidal shaped top portion combined with a bottom portion having one or more flat edges, or vice versa. One having ordinary skill in the art will recognize that regardless of the size and shape of the base and top portions, the connection studs 116, 152 should be sized to fit the horizontal member 118 and the vertical member 120 to allow the functionality described above.

All references, including publications, patent applications, and patents cited herein are hereby incorporated by reference to the same extent as if each reference were individually and specifically indicated to be incorporated by reference and were set forth in its entirety herein. While there are many embodiments, it should be noted that the entire system as described may be turned ninety degrees, with the horizontal members becoming vertical and the vertical members becoming horizontal. The embodiments described herein assume that photographs or other objects will be displayed while being held or supported on their vertical sides. However, the entire system may be turned ninety degrees so that photographs may be supported on their horizontal (top and bottom) sides instead.

For purposes of this specification, the term "photographs" will mean any type of media that would be recognized by one skilled in the art as compatible with and able to be supported by the present invention, including, but not limited to, scrapbooking media, artwork, children's artwork, multimedia, or any other media that one would display.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for supporting photographs having opposite edges thereof spaced apart by a width of the photograph, comprising:
    at least one horizontal member, at least two vertical members and at least two connection studs;
    each of said connecting studs having a base portion, a central post portion and a top portion of the connecting stud, with the central post portion connected at opposite axial ends thereof to the base portion and the top portion of the connection stud;
    said horizontal member including a wall mounting side and a vertical member mounting side, with the vertical member mounting side having an upper and a lower lip defining a horizontal sliding aperture extending along a longitudinal length of the horizontal member, opening away from said wall mounting side, and configured to slidingly receive the base portions of the at least two connection studs;
    each of said vertical members including a horizontal member mounting side having first and second vertical sliding lips cooperatively defining a vertical sliding aperture extending along a respective longitudinal axis of each vertical member and opening toward the horizontal member when the vertical member is positioned on top of the horizontal member with the horizontal member mounting side of the vertical member facing the vertical member mounting side of the horizontal member, the vertical sliding aperture also being configured to slidingly receive the top potion of one of the connection studs for joining the vertical member to the horizontal member;
    each of said vertical members further defining a continuous support notch extending longitudinally along the vertical member and opening in a direction generally perpendicular to the vertical sliding aperture, the support notch being configured for receiving and retaining therein one of the edges of the photograph;
    each of said vertical members being slidingly respectively secured to said horizontal member by one of said connection studs with said vertical members overlying the horizontal member, and spaced from one another by approximately the width of the photograph with their respective vertical support notches facing toward one another for respective receipt therein of the opposite edges of the photograph.

2. The system of claim 1, wherein, the connection studs and vertical and horizontal members are cooperatively configured to provide an interference fit therebetween such that the connection studs are sufficiently gripped by the horizontal and vertical members to maintain a desired position of the connection studs in the vertical and horizontal sliding apertures.

3. The system of claim 1, wherein the system for supporting photographs does not include a spring clamp.

4. The system of claim 1, wherein said base portion of said connection stud is discoidal.

5. The system of claim 1, wherein, the connection stud is configured for maintaining the horizontal and vertical members at a desired angle $\theta$ with respect to one another.

6. The system of claim 5, wherein at least one of said base and top portions of said connection stud includes one or more flat surfaces thereof configured for interaction with at least one of the horizontal and vertical members to preclude rotation of the connection stud.

7. The system of claim 6, wherein:
    the base portion of at least one of said connection studs includes one or more flat surfaces thereof configured for interaction with the horizontal member to preclude rotation of the at least one of the connection studs with respect to the horizontal member, and;
    the top portion of the at least one of said connection studs includes one or more flat surfaces thereof configured for interaction with one of said vertical members to preclude rotation of the at least one of the connection studs with respect to the one of said vertical member.

8. The system of claim 1, wherein said connection stud is at least partially formed of a metallic material.

9. The system of claim 8, wherein, the stud is formed of a non-metallic material with the post portion of the stud being at least partly formed of a metallic material.

10. The system of claim of claim 1, wherein, the desired angle $\theta$ of the vertical members with respect to the horizontal member is other than perpendicular with the vertical members extending parallel to one another.

11. The system of claim 1, further comprising, the photograph.

* * * * *